US011515939B2

(12) United States Patent
Enomoto et al.

(10) Patent No.: US 11,515,939 B2
(45) Date of Patent: Nov. 29, 2022

(54) MONITORING DEVICE

(71) Applicant: NIPPON TELEGRAPH AND TELEPHONE CORPORATION, Tokyo (JP)

(72) Inventors: Yoshitaka Enomoto, Musashino (JP); Hideo Kawata, Musashino (JP); Kazuhisa Furusawa, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/312,140

(22) PCT Filed: Dec. 3, 2019

(86) PCT No.: PCT/JP2019/047191
§ 371 (c)(1),
(2) Date: Jun. 9, 2021

(87) PCT Pub. No.: WO2020/129613
PCT Pub. Date: Jun. 25, 2020

(65) Prior Publication Data
US 2022/0045751 A1    Feb. 10, 2022

(30) Foreign Application Priority Data

Dec. 17, 2018  (JP) .............................. JP2018-235876

(51) Int. Cl.
*H04B 17/00* (2015.01)
*H04B 10/077* (2013.01)
(52) U.S. Cl.
CPC .............................. *H04B 10/0775* (2013.01)

(58) Field of Classification Search
CPC .................................................. H04B 10/0775
(Continued)

(56) References Cited

U.S. PATENT DOCUMENTS

2007/0073508 A1   3/2007  Taniguchi et al.
2010/0002591 A1*  1/2010  Mizutani ................. H04L 45/26
                                                            370/468

FOREIGN PATENT DOCUMENTS

JP   2007096847 A   4/2007
JP   2010258895 A  11/2010
JP   2012205290 A  10/2012

OTHER PUBLICATIONS

International Telecommunication Union, OAM functions and mechanisms for Ethernet based networks, IYU-T Y.1731, May 2006.
(Continued)

*Primary Examiner* — Mohammad R Sedighian

(57) ABSTRACT

An object is to provide a monitoring device capable of acquiring ONU-specific information and connection information even in the case of an optical communication system with the MC system, and enabling optical fiber cable switching work to be finished in a short time. The monitoring device according to the present invention is a monitoring device that monitors an optical communication system in which an OLT and an ONU are connected by a communication optical fiber, and includes: an optical receiver for receiving a signal beam transmitted by the ONU from the communication optical fiber; and an OAM frame analysis unit for extracting, from the signal beam received by the optical receiver, an OAM frame at a MEG level at which the ONU and the OLT are set as monitoring end points, and acquiring a transmission source address and a MEG-ID that identifies a MEG in the OAM frame.

4 Claims, 10 Drawing Sheets

(58) Field of Classification Search
USPC .......................................................... 398/25
See application file for complete search history.

(56) References Cited

OTHER PUBLICATIONS

The Telecommunication Technology Committee, OAM functions and mechanisms for Ethernet based networks, JT-Y1731, Feb. 24, 2010, pp. 1-94.

* cited by examiner

MONITORING DEVICE

CROSS-REFERENCE TO RELATED APPLICATIONS

This application is a 371 U.S. National Phase of International Application No. PCT/JP2019/047191 filed on Dec. 3, 2019, which claims priority to Japanese Application No. 2018-235876 filed on Dec. 17, 2018. The entire disclosures of the above applications are incorporated herein by reference.

TECHNICAL FIELD

The present disclosure relates to a monitoring device that monitors the communication state in an optical access section between an optical line terminal and an optical network unit that are connected via an optical fiber transmission path. This monitoring device can be applied to various communication standards such as 100 Mbps, 1 Gbps (gigabits), and 10 Gbps.

BACKGROUND ART

When an optical fiber cable is relocated during hindrance relocation work such as road construction, it is necessary to cut the existing optical fiber cable and reconnect to a newly-installed optical fiber cable. Also, during work for switching an optical fiber cable to another one, it is necessary to similarly cut the existing optical fiber cable and reconnect to the other optical fiber cable. In such optical fiber cable switching work, optical fibers in the optical fiber cable are temporarily cut, which may interrupt a service even though a user is using a service.

An optical access network will be described below. As shown in FIG. 1, a media converter (MC) system refers to a network in which one optical line terminal (OLT) 3 performs point-to-point communication with one optical network unit (ONU) 2 via one optical fiber. A communication terminal 1 used by a user can receive a service from a backbone network via the ONU over the OLT 3. Also, as shown in FIG. 2, a passive optical network (PON) system refers to a network in which one OLT 3 performs point-to-multipoint (P2MP) communication with a plurality of ONUs 2-N, which are connected to respective communication terminals 1-N, via optical fibers and a one-to-N optical splitter 4 (N is a natural number).

Ethernet (registered trademark) defined by IEEE802.3 is used as the standard for MC and PON. Note that EPON (Ethernet (registered trademark)) Passive Optical Network) has been standardized as a standard for Ethernet (registered trademark) conforming to PON.

As shown in FIG. 3, an optical access network system is constituted by an MC system, a PON system, an optical fiber termination stand 5 and a service demultiplexing device 6 within a station. Note that each of a plurality of communication terminals is denoted as 1-N, each of a plurality of ONUs is denoted as 2-N, and each of a plurality of OLTs is denoted as 3-N. The optical fiber termination stand 5 aggregates optical fibers from the OLTs 3-N and optical fibers extending out of the station. Here, the MC system and the PON system are accommodated in a mixed manner in the optical fiber termination stand 5. Furthermore, each optical fiber is connected to an optical coupler 5-N for an optical time-domain reflectometer (OTDR) 7. The service demultiplexing device 6 aggregates optical fibers extending from the OLTs 3-N and connects to the backbone network. The service demultiplexing device 6 has a mirroring port, and can monitor traffic flowing through the optical fibers in the MC system and the PON system via this mirroring port.

A conventional communication monitoring method will be described below.

As a first communication monitoring method, traffic for each communication terminal 1-N can be monitored by connecting a protocol analyzer that functions as a communication monitoring device to the mirroring port of the service demultiplexing device 6 (e.g. see NPL 1). However, since an optical fiber that is being used in the traffic cannot be directly identified, the optical fiber with which a user is using a service cannot be specified during optical fiber switching work.

As a second communication monitoring method, if an optical power meter is connected to the optical couplers 5-N for the OTDR 7 in the optical fiber termination stand 5, the presence of an optical signal in each optical fiber can be determined. However, whether or not a user is actually using a service cannot be determined based only on the presence of an optical signal.

As a third communication monitoring method, a conventional MC communication monitoring device 8 connects to optical fibers in the MC system through the optical couplers 5-N in the optical fiber termination stand 5, and can monitor traffic flowing through the optical fibers in the MC system. As shown in FIG. 4, the conventional MC communication monitoring device 8 is constituted by an optical receiver 81, an MC signal processing function unit 82, and a display function unit 83. The optical receiver 81 receives an Ethernet (registered trademark) optical signal via the optical couplers 5-N for the OTDR 7. The MC signal processing function unit 82 performs frame processing on the signal received by the optical receiver 81 and collects traffic information (count of the number of frames, content of the frames). The display function unit 83 can display the collected traffic information on a predetermined display screen of the MC communication monitoring device 8 (e.g. see NPL 1).

As a fourth communication monitoring method, a conventional PON communication monitoring device 9 connects to optical fibers in the PON system via the optical couplers 5-N in the optical fiber termination stand 5, and can monitor traffic flowing through the optical fibers in the PON system. As shown in FIG. 5, the conventional PON communication monitoring device 9 is constituted by an optical receiver 91, a PON signal processing function unit 92, and a display function unit 93. The optical receiver 91 receives an Ethernet (registered trademark) optical signal via the optical couplers 5-N for the OTDR 7. The PON signal processing function unit 92 processes the signal received by the optical receiver 91 as MAC frames for PON, and collecting an MPCP frame and traffic information for each of the LLIDs assigned to the respective ONUs 2-N. In addition, the PON signal processing function unit 92 reads out the LLID and a transmission source address from the MPCP frame, and the display function unit 93 displays the collected traffic information on a predetermined display screen of the communication monitoring device 9.

As a fifth communication monitoring method, in an optical access network system such as that shown in FIG. 3, an uplink optical signal from an ONU 2-N to an OLT 3-N is received by an optical receiver 101 via an optical coupler 5-N on an optical fiber transmission path, and it is determined using the signal received by the optical receiver 101 whether the communication is performed by the MC system or the PON system, based on a difference (presence of an LLID etc.) in a preamble in a MAC frame in the received signal. In the case of communication performed by the MC system, a link between the ONU 2-N and the OLT 3-N is established, and the state of communication with each priority is displayed on a predetermined display screen of the display function unit 107. In the case of communication performed by the PON system, a link between each of the ONU 2-N and the OLT 3-N is established, and the state of communication with each priority for the respective ONUs 2-N is displayed on the predetermined display screen by the display function unit 107 (e.g. see PTL 2).

In a GE-PON system, upon an ONU being connected to an OLT, the OLT automatically discovers the ONU, and automatically establishes a communication link. This function is called a P2MP (Point to Multi Point) discovery function. However, if a communication link is automatically established when an ONU is connected to an OLT, access is enabled even in the case where an unauthorized user attaches the ONU. To eliminate automatic establishment of a communication link in the case of such an unauthorized connection, the GE-PON system has an ONU authentication function, and disables communication between ONUs other than an authorized ONU and a host network (backbone network) of the OLT.

An example of the ONU authentication function is MAC address authentication defined by IEEE802.1X. In this authentication method, a MAC address of an ONU (authorized ONU) that is permitted connection is registered in advance in each OLT. Regarding communicate with the host network of the ONU discovered by the P2MP discovery function, in this authentication method, only the ONU that has the registered MAC address is permitted to communicate therewith. The state of an ONU whose MAC address is registered in the OLT and that is allowed to communicate with the host network is referred to as an "authenticated state".

The communication monitoring device can determine whether or not an ONU in the GE-PON system is in the "authenticated state", based on the number of control frames transmitted from the ONU to the OLT in response to a transmission permission message transmitted from the OLT to the ONU (e.g. see PTL 3).

CITATION LIST

Patent Literature

[PTL 1] Japanese Patent Application Laid-open No. 2007-96847
[PTL 2] Japanese Patent Application Laid-open No. 2010-258895
[PTL 3] Japanese Patent Application Laid-open No. 2012-205290

Non Patent Literature

[NPL 1] ITU-T Recommendation Y. 1731, OAM functions and mechanisms for Ethernet
[NPL 2] JT-Y1731 OAM Function of Ethernet and Mechanism TTC Standard

SUMMARY OF THE INVENTION

Technical Problem

In the optical fiber cable switching work, a transmission source (ONU) of an optical signal and a connection destination (OLT) thereof needs to be checked before and after the switching. In the PON system, the transmission source and connection information (information regarding the OLT) can be acquired from ONU-specific information and the authentication method, respectively. In the case of the MC system, however, the MPCP frame is not used unlike the PON system, and it is therefore difficult to acquire the ONU-specific information and connection information using the aforementioned fourth communication monitoring method.

For example, according to the aforementioned fifth communication monitoring method, determination can be automatically made without being aware of whether the optical access network to which the monitoring device is connected performs communication using the MC system or communication using the PON system. In the case of the MC system, however, the monitoring device cannot display ONU-specific information as in the PON system.

Moreover, the MC system does not necessarily have the authentication method in the PON system. The authentication method in the PON system is a method in which a MAC address of an ONU (authorized ONU) that is permitted connection is registered in advance in the OLT, and regarding communication with a host network of the ONU discovered by the P2MP discovery function, only the ONU that has the registered MAC address is permitted to communication therewith. For this reason, in the MC system that does not have the authentication method in the PON system, the connection state cannot be ascertained.

In the MC system as well, the connection state can be estimated based on the presence of data indicating each priority described in PTL 2, but the data indicating each priority is not necessarily flowing immediately after the switching of an optical fiber cable.

For this reason, immediately after switching an optical fiber cable, an on-site operator needs to request an operator in an operation center to check the connection state between an OLT and an ONU on an Ops (Operation system) that manages the communication state between OLTs and ONUs in the MC system, and the operator needs to operate the Ops and inform the on-site operator of the result of checking the connection state.

While the operator is thus making a check on the Ops in the MC system, a wait time of the on-site operator occurs. Moreover, if the operator in the operation center receives check requests from a plurality of work sites at the same time, the checks require time, and on-site operators may need to wait for a longer time. That is to say, in an optical communication system with the MC system, there may be cases where ONU-specific information and connection information cannot be acquired, and there is a possibility that the work time is prolonged in optical fiber cable switching work.

To solve the foregoing problems, an object of the present invention is to provide a monitoring device capable of acquiring ONU-specific information and connection information even in the case of an optical communication system with the MC system, and enabling optical fiber cable switching work to be finished in a short time.

Means for Solving the Problem

To achieve the above object, a monitoring device according to the present invention acquires ONU-specific information and connection information using an OAM (Operation Administration and Maintenance) frame.

Specifically, the monitoring device according to the present invention is a monitoring device that monitors an optical communication system in which an optical line terminal (OLT) and an optical network unit (ONU) are connected by a communication optical fiber, including:

an optical receiver for receiving a signal beam transmitted by the ONU from the communication optical fiber; and an OAM frame analysis unit for extracting, from the signal beam received by the optical receiver, an OAM (Operation Administration and Maintenance) frame at a MEG (Maintenance Entity Group) level at which the ONU and the OLT are set as monitoring end points, and acquiring a transmission source address and a MEG-ID that identifies a MEG in the OAM frame.

By acquiring the transmission source address and the MEG-ID from the OAM frame, the former can be used as the ONU-specific information, and the latter can be used as the connection information. That is to say, the monitoring device according to the present invention can acquire the ONU-specific information and the connection information even in the case of an optical communication system with the MC system, and enable optical fiber cable switching work to be finished in a short time.

The monitoring device according to the present invention further includes:

a storage unit for storing the transmission source address and the MEG-ID acquired by the OAM frame analysis unit; and a determination unit for comparing, at a point in time, the transmission source address and the MEG-ID acquired by the OAM frame analysis unit with the transmission source address and the MEG-ID stored in the storage unit, and determining a state of the optical communication system.

The determination unit determines that the ONU has been incorrectly connected if the transmission source address does not match before and after the point in time, and determines that the OLT has been incorrectly connected if the MEG-ID does not match before and after the point in time.

The monitoring device according to the present invention further includes a signal type determination unit for detecting a MAC address in the signal beam received by the optical receiver, determining a type of the optical communication system based on a preamble of the MAC address, and transferring the signal beam to the OAM frame analysis unit if the optical communication system is of a point-to-point type.

Whether the optical communication system to be monitored uses the PON system or the MC system can be automatically determined.

Effects of the Invention

The present invention can provide a monitoring device capable of acquiring ONU-specific information and connection information even in the case of an optical communication system with the MC system, and enabling optical fiber cable switching work to be finished in a short time.

DESCRIPTION OF EMBODIMENTS

Figure 1:
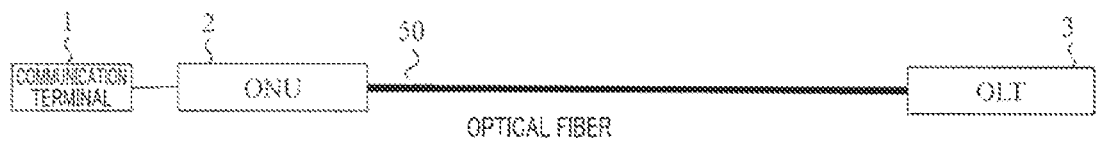
FIG. 1 is a diagram illustrating an optical communication system with the MC system.
Figure 2:
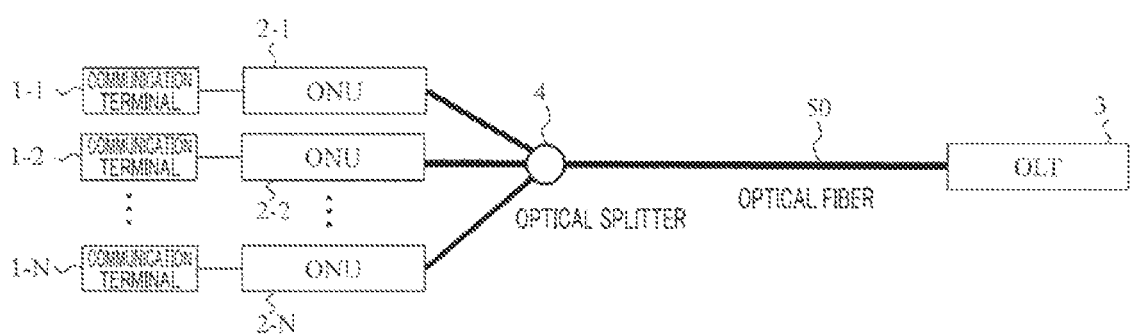
FIG. 2 is a diagram illustrating an optical communication system with the PON system.

Embodiments of the present invention will be described with reference to the attached drawings. The embodiments described below are examples of the present invention, and the present invention is not limited to the following embodiments. Note that constituent elements with the same reference numerals in the specifications and the drawings are identical to each other.

Figure 6:
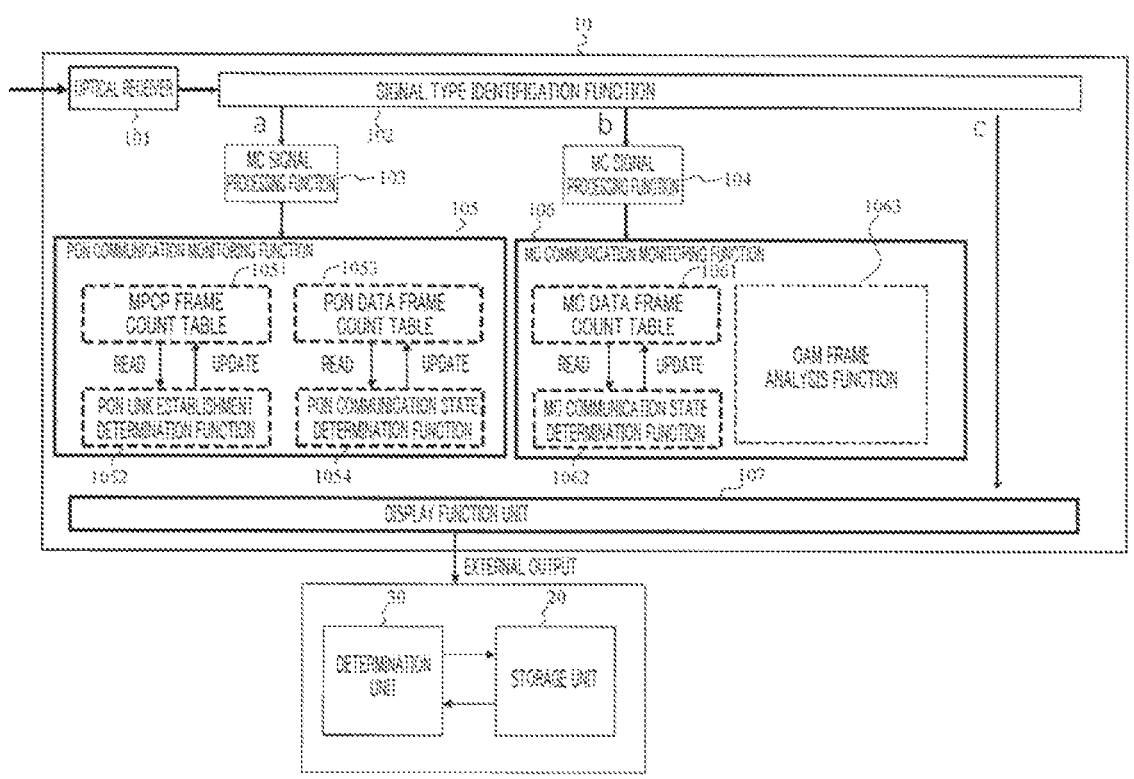
FIG. 6 is a diagram illustrating a monitoring device according to the present invention.

FIG. 6 is a functional block diagram of a communication monitoring device 10 according to the present embodiment. The communication monitoring device 10 is a monitoring device for monitoring an optical communication system in which an OLT and an ONU are connected by communication optical fibers, and includes an optical receiver 101, a signal type identification function unit 102, a PON signal processing function unit 103, an MC signal processing function unit 104, a PON communication monitoring function unit 105, an MC communication monitoring function unit 106, and a display function unit 107.

The optical receiver 101 receives a signal beam (uplink optical signal) transmitted by the ONU from the communication optical fibers.

The PON communication monitoring function unit 105 has an MPCP frame count table 1051 and a PON data frame count table 1053, which are stored in a memory (not shown), and a PON link establishment determination function unit 1052 and a PON communication state determination function unit 1054 for controlling access to these tables and updating thereof, respectively. Since the PON communication monitoring function unit 105 and frame processing are described in detail in PTL 2, description thereof is omitted here.

The MC communication monitoring function unit 106 has an MC data frame count table 1061, which is stored in a memory (not shown), an MC communication state determination function unit 1062 for controlling access to this table and updating thereof, and an OAM frame analysis unit 1063. The OAM frame analysis unit 1063 extracts, from the signal beam received by the optical receiver 101, an OAM (Operation Administration and Maintenance) frame at MEG (Maintenance Entity Group) level at which the ONU and the OLT are set as monitoring end points, and acquires a transmission source address and an MEG-ID that identifies the MEG in the OAM frame.

The signal type determination unit 102 detects a MAC frame in the signal beam received by the optical receiver 101, and determines the type of the optical communication system based on a preamble of the MAC frame. If the optical communication system is of a point-to-point type, the signal type determination unit 102 transfers the signal beam to the OAM frame analysis unit 1063.

Figure 3:
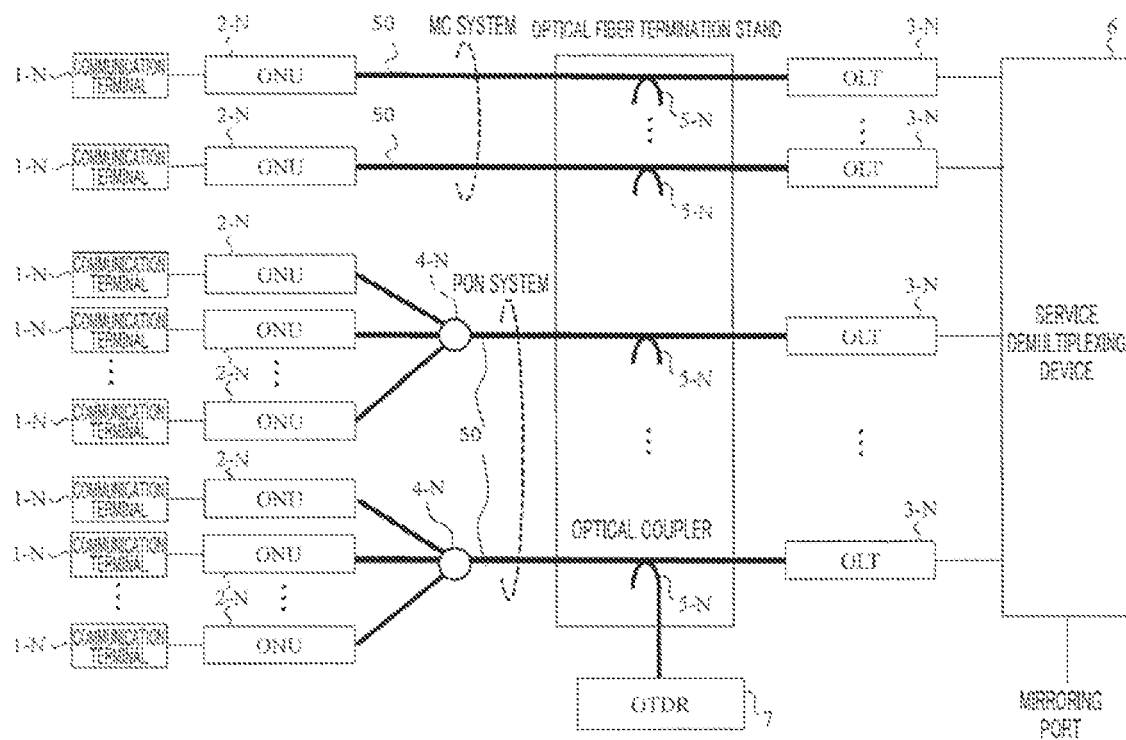
FIG. 3 is a diagram illustrating an optical access network system in which the MC system and the PON system mix.
Figure 4:
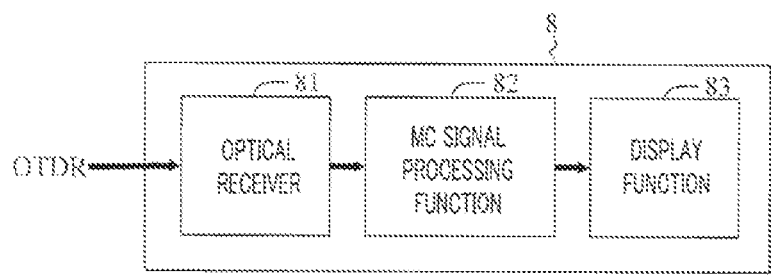
FIG. 4 is a diagram illustrating a communication monitoring device for the MC system.
Figure 5:
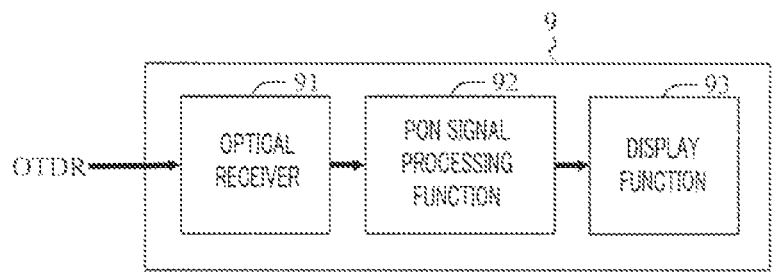
FIG. 5 is a diagram illustrating a communication monitoring device for the PON system.

In the optical access network system such as that shown in FIG. 3, the communication monitoring device 10 connects an uplink optical signal from the ONUs 2-N to the OLTs 3-N to the optical couplers 5-N on an optical fiber transmission path. The optical receiver 101 receives the uplink optical signal, which is regarded as a received signal, and the signal type determination unit 102 determines whether this uplink optical signal is communication using the MC system or communication using the PON system, based on a difference (presence of an LLID etc.) in the preamble in the MAC frame in the received signal.

If the uplink optical signal is communication using the PON system, the signal type determination unit 102 transfers the received signal to the PON signal processing unit 103. The PON signal processing unit 103 and the PON communication monitoring function unit 105 check the unique ID (e.g. MAC address) of each ONU 2-N, the connection state between each ONU 2-N and the OLT 3-N, and the state of communication with each priority for each ONU 2-N. The display function unit 107 then displays the unique ID, the connection state, and the state of communication with each priority on a predetermined display screen.

If the uplink optical signal is communication using the MC system, the signal type determination unit 102 transfers the received signal to the MC signal processing unit 104. The MC signal processing unit 104 and the MC communication monitoring function unit 106 checks the unique ID of the ONU 2-N, the connection state (ID indication) between the ONU 2-N and the OLT 3-N, and the state of communication with each priority for each ONU 2-N. The display function unit 107 then displays the unique ID, the connection state, and the state of communication with each priority on a predetermined display screen using the display function unit 107.

Here, it will be described that the check of the unique ID of the ONU 2-N, the connection state (ID indication) between the ONU 2-N and the OLT 3-N, and the state of communication with each priority of each ONU 2-N in the case of the MC system can be realized through processing performed by the OAM frame analysis unit 1063.

The present embodiment will give a description while taking an example using an Ethernet (registered trademark) OAM technology for connection monitoring in a communication network described in ITU-T Y.1731 (see NPL 1 and NPL 2). Note that, in addition to the Ethernet (registered trademark) OAM technology, the check can be performed using a similar procedure if a frame transmitted and received between the OLT and the ONU includes information with which the ONU and the OLT can be identified, and there is a means capable of identifying the aforementioned frame.

In the Ethernet (registered trademark) OAM technology, a device located at a monitoring end point is set as an MEP (MEG End Point). A plurality of MEGs (Maintenance Entity Groups) can be set as a monitoring group that includes the MEP. Also, domains of OAM functional units are configured for each of a plurality of tiered maintenance levels, which are referred to as customer level, provider level, and operator level. These domains are called MEG levels.

In the Ethernet (registered trademark) OAM technology, an MEG-ID is given as an identifier that uniquely identifies a MEG at each MEG level, and enables detection of a line failure that has occurred in the MEG by regularly transmitting and receiving a MAC frame called an OAM frame for monitoring between devices in the MEG.

Here, attention is paid to the MEG level at which the OLT and the ONU are set as the MEPs, and the given MEG-ID is sent out from the OLT side to the ONU side and stored in an internal memory of the ONU. OAM frames that contain the MEG-ID is also regularly transmitted and received between the OLT and the ONU.

The MC signal processing function unit 104 acquires OAM frames from the ONU in the received signal.

The OAM frame analysis unit 1063 extracts an OAM frame at the MEG level at which the ONU and the OLT are monitoring end points, from the OAM frames from the ONU. Then, the OAM frame analysis unit 1063 outputs, to the display unit 107, the transmission source address in this OAM frame as the unique ID of the ONU, and the MEG-ID in the OAM frame as the unique ID that identifies the MEG that includes the OLT.

Meanwhile, the MC communication state determination unit 1062 reads out a user priority bit (priority) of a VLAN of data frames, and counts the data frames for each priority in a predetermined time of an observation period. The MC communication state determination unit 1062 stores the count result as the state of communication with each priority in the MC data frame count table 1061, and outputs the count result to the display unit 107.

Figure 7:
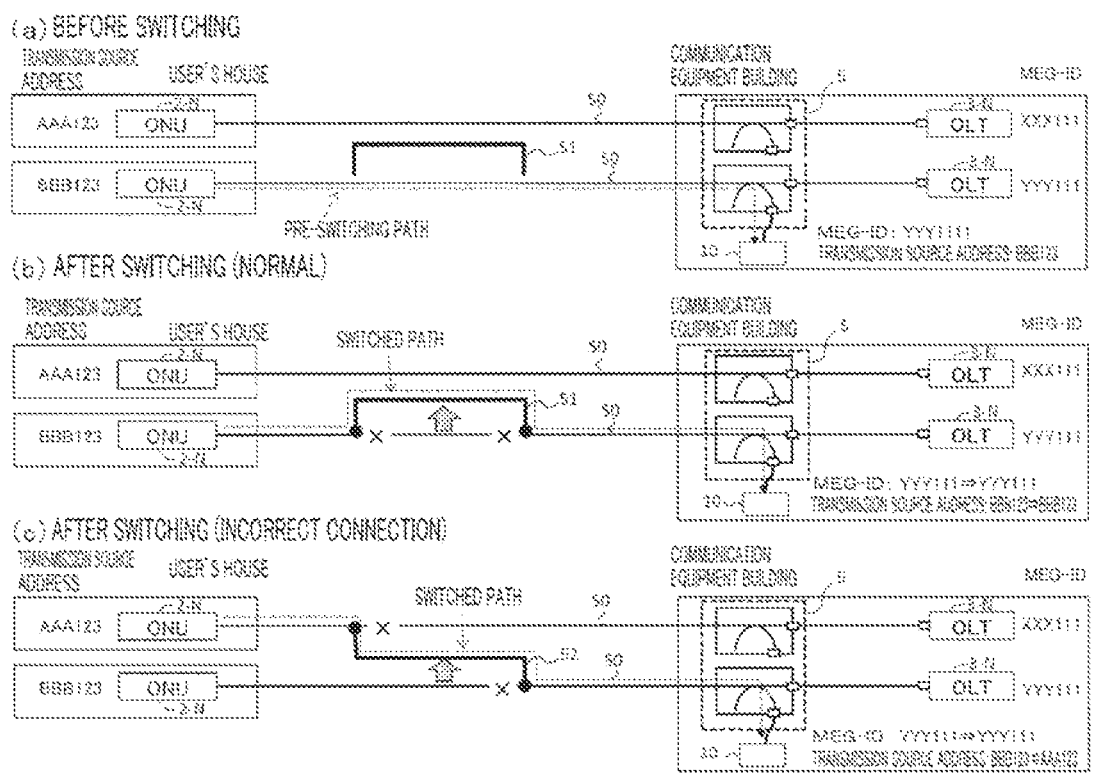
FIG. 7 illustrates optical fiber cable switching work using the monitoring device according to the present invention.
Figure 8:
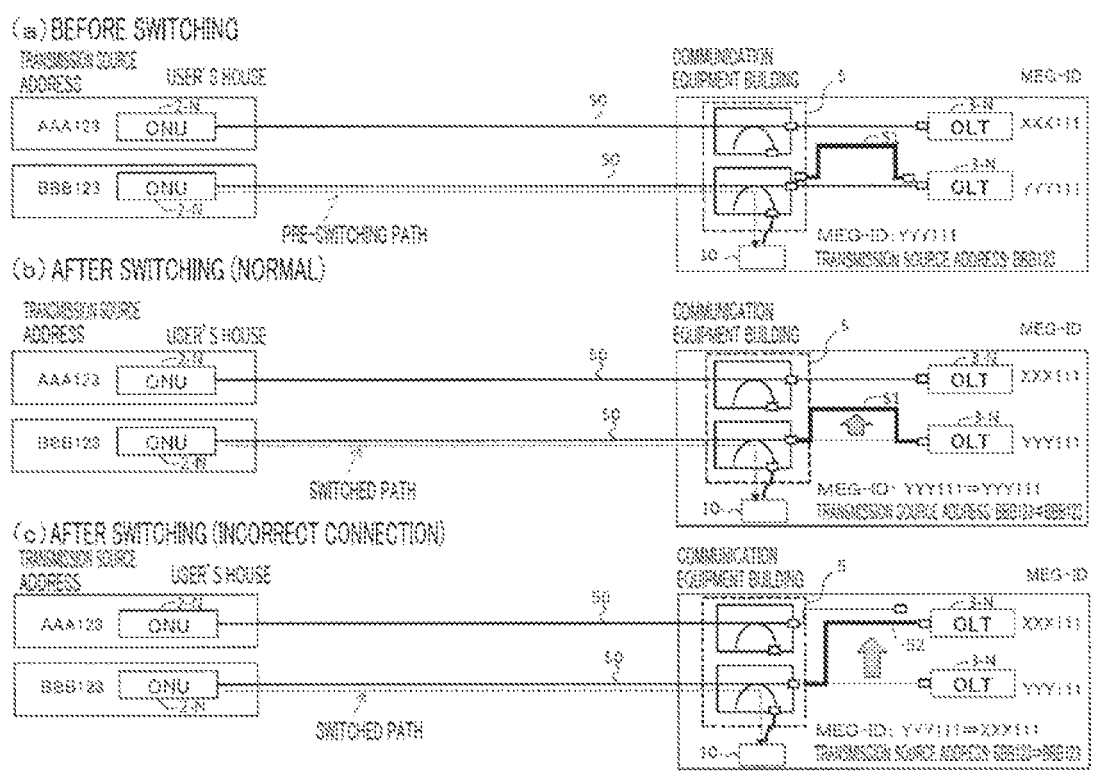
FIG. 8 illustrates optical fiber cable switching work using the monitoring device according to the present invention.

FIGS. 7 and 8 are diagrams illustrating optical fiber cable switching work using the communication monitoring device 10. External output of the communication monitoring device 10 is connected to a storage unit 20 and a determination unit 30. Here, the storage unit 20 stores the aforementioned transmission source address and MEG-ID acquired by the OAM frame analysis unit 1063. The determination unit 30 compares, at a point in time, the transmission source address and the MEG-ID acquired by the OAM frame analysis unit 1063 with the transmission source address and the MEG-ID stored in the storage unit 20, and determines the state of the optical communication system. If the transmission source address does not match before or after that point in time, the determination unit 30 determines that the ONU has been incorrectly connected, and if the MEG-ID does not match, the determination unit 30 determines that the OLT has been incorrectly connected.

FIG. 7 illustrates switching of an optical fiber cable 50 between a communication equipment building and a user's house. OLTs 3-N and ONUs 2-N are set as MEPs, which are assigned a MEG-ID. As shown in FIG. 7(*a*), the communication monitoring device 10 is connected to an optical coupler in the optical fiber termination stand 5, and the transmission source address (BBB123) and the MEG-ID (YYY111) before the switching of the optical fiber cable 50 are stored in the communication monitoring device 10.

As shown in FIG. 7(*b*), if the optical fiber cable 50 is correctly switched to an optical fiber cable 51, the transmission source address and the MEG-ID match before and after the switching of the optical fiber cable. For this reason, the operator or the determination unit 30 of the communication monitoring device 10 determines that the optical fiber has been correctly switched.

On the other hand, if the optical fiber cable 50 is incorrectly switched to an optical fiber cable 52 and connected to a different ONU as shown in FIG. 7(*c*), the transmission source address is BBB123 before the switching of the optical fiber cable, but is AAA123 after the switching. Since the transmission source address differs before and after the switching of the optical fiber cable, the operator or the determination unit 30 of the communication monitoring device 10 can determine that the optical fiber has been incorrectly switched (incorrect connection).

FIG. 8 illustrates switching of an optical fiber cable between an OLT 3-N and the optical fiber termination stand 5 in a communication equipment building. The OLT 3-N and an ONU 2-N are set as MEPs, which are assigned a MEG-ID. As shown in FIG. 8(a), the communication monitoring device 10 is connected to an optical coupler in the optical fiber termination stand 5, and the transmission source address (BBB123) and the MEG-ID (YYY111) are stored in the communication monitoring device 10 before the switching of the optical fiber cable 50.

As shown in FIG. 8(b), if the optical fiber cable 50 is correctly switched to an optical fiber cable 51 in the communication equipment building, the transmission source address and the MEG-ID match before and after the switching of the optical fiber cable. For this reason, the operator or the determination unit 30 of the communication monitoring device 10 determines that the optical fiber has been correctly switched.

On the other hand, if the optical fiber cable 50 is incorrectly switched to an optical fiber cable 52 and connected to a different OLT in the communication equipment building as shown in FIG. 8(c), a new MEG-ID (XXX111) is sent from the OLT to the ONU, and the new MEG-ID (XXX111) is sent from the ONU to the communication monitoring device 10. Since the MEG-ID differs before and after the switching of the optical fiber cable, the operator or the determination unit 30 of the communication monitoring device 10 can determine that the optical fiber has been incorrectly switched (incorrect connection).

Thus, the use of the communication monitoring device 10 is also helpful in specifying a cause in the case of an incorrect switching, in addition to the determination that an optical fiber cable has been correctly switched.

Figure 9:
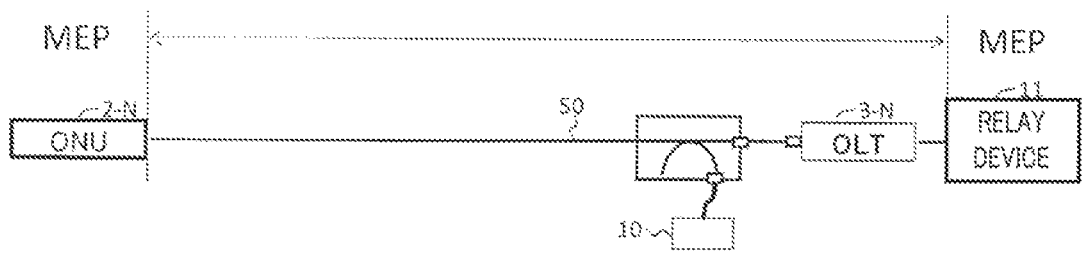
FIG. 9 is a diagram illustrating monitoring of an optical communication system using the monitoring device according to the present invention.
Figure 10:
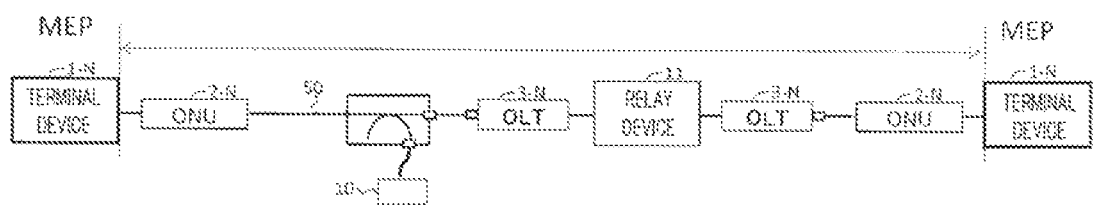
FIG. 10 is a diagram illustrating monitoring of an optical communication system using the monitoring device according to the present invention.

In the present embodiment, an OLT 3-N and an ONU 2-N are used as MEPs. As another embodiment, a MEG-ID assigned to MEGs that are an ONU 2-N and a relay device 11 connected to an OLT 3-N, and a transmission source address of the ONU may alternatively be used, as shown in FIG. 9. Also, as another embodiment, a MEG-ID assigned to MEPs that are terminal devices 1-N connected to respective ONUs 2-N, and a transmission source address of a terminal devices 1-N may alternatively be used, as shown in FIG. 10.

[Supplementary Note] The following is a description of the communication monitoring device according to the present embodiment.

(1):

In an optical communication system in which an OLT and an ONU are connected by one or more communication optical fibers, the communication monitoring device is connected to an optical coupler for splitting a signal beam propagated from the ONU through the communication optical fibers, to cause the signal beam to flow toward an optical fiber for measurement, the optical coupler being disposed between the OLT and the ONU on the communication optical fiber, and to the optical fiber for measurement, acquires an identifier from the signal beam propagated from the connected ONU, checks the acquired identifier against identifier stored in advance, and uses, as the identifier, an address that identifies a management unit of the OLT and the ONU.

(2):

The communication monitoring device according to (1) above, which is connected to the optical fiber for measurement, acquires an identifier from a signal beam propagated from the connected ONU, and checks the acquired identifies against the identifies stored in advance, uses, as the identifier, the address that identifies the management unit of the OLT and the ONU described in (1) above, and a transmission source address described in a frame of the signal beam propagated from the ONU.

(3):

In the communication monitoring device according to (1) or (2) above, which is connected to the optical fiber for measurement, acquires an identifier from a signal beam propagated from the connected ONU, and checks the acquired identifies against the identifies stored in advance, determines, when connected to an optical fiber, whether a transmission method is of a point-to-point type or a point-to-multipoint (P2MP) type, based on the signal beam from the ONU, and performs processing described in (1) or (2) above only if the transmission method is of the point-to-point type.

Effects

By determining an optical communication system with the MC system and a connection state, an on-site operator can promptly determine whether or not an optical fiber cable has been correctly switched in optical fiber cable switching work.

In addition, the switching of an optical fiber cable can be finished in a short time without placing a burden on an operator in an operation center, and the present invention also contributes to service improvement for users, including prevention of incorrect connection, shortening of the time during which the service is not available, and so on.

In the case of an incorrect connection, whether it has occurred on the OLT side or the ONU side can be determined, and it is therefore possible to recheck and reconnect the optical fiber in a short time.

INDUSTRIAL APPLICABILITY

The monitoring device according to the present invention can be applied to not only Gigabit Ethernet (registered trademark) as in the embodiments, but also other standards (Ethernet (registered trademark) with a communication speed of 100 Mbps or 10 Gbps, for example).

REFERENCE SIGNS LIST 1, 1-N Communication terminal
2, 2-N ONU
3, 3-N OLT
4 Optical splitter
5 Optical fiber termination stand
6 Service demultiplexing device
7 OTDR
8 MC communication monitoring device
9 PON communication monitoring device
10 Communication monitoring device
11 Relay device
20 Storage unit
30 Determination unit
50, 51, 52 Optical fiber cable
81 Optical receiver
82 MC signal processing unit
83 Display unit
91 Optical receiver
92 PON signal processing unit
93 Display unit
101 Optical receiver
102 Signal type identification function unit 103 PON signal processing function unit
104 MC signal processing function unit
105 PON communication monitoring function unit
106 MC communication monitoring function unit
107 Display function unit
1051 MPCP frame counter table
1052 PON link establishment determination unit
1053 PON data frame counter table
1054 PON communication state determination unit
1061 MC data frame counter table
1062 MC communication state determination unit
1063 OAM frame analysis unit

The invention claimed is:

1. A monitoring device that monitors an optical communication system in which an optical line terminal (OLT) and an optical network unit (ONU) are connected by a communication optical fiber, the monitoring device comprising:
    an optical receiver for receiving a signal beam transmitted by the ONU from the communication optical fiber;
    an OAM (Operation Administration and Maintenance) frame analysis unit for extracting, from the signal beam received by the optical receiver, an OAM frame at a MEG (Maintenance Entity Group) level at which the ONU and the OLT are set as monitoring end points, and acquiring a transmission source address and a MEG-ID that identifies a MEG in the OAM frame;
    a storage unit for storing the transmission source address and the MEG-ID; and
    a determination unit for comparing, at the point in time, the transmission source address and the MEG-ID stored in the storage unit, and determining a state of the optical communication system,
    wherein the determination unit determines that the ONU has been incorrectly connected if the transmission source addresses do not match before and after the point in time, and
    the determination unit determines that the OLT has been incorrectly connected if the MEG-IDs do not match before and after the point in time.

2. The monitoring device according to claim 1, further comprising a signal type determination unit for detecting a MAC frame in the signal beam received by the optical receiver, determining a type of the optical communication system based on a preamble of the MAC frame, and transferring the signal beam to the OAM frame analysis unit if the optical communication system is of a point-to-point type.

3. A monitoring method of monitoring an optical communication system in which an optical line terminal (OLT) and an optical network unit (ONU) are connected by a communication optical fiber, the monitoring method comprising:
    receiving a signal beam transmitted by the ONU from the communication optical fiber;
    extracting, from the received signal beam, an OAM (Operation Administration and Maintenance) frame at a MEG (Maintenance Entity Group) level at which the ONU and the OLT are set as monitoring end points, and acquiring a transmission source address and a MEG-ID that identifies a MEG in the OAM frame;
    storing the transmission source address and the MEG-ID in a storage; and
    comparing, at a point in time, the transmission source address and the MEG-ID with the transmission source address and the MEG-ID stored in the storage, and determining a state of the optical communication system,
    wherein the ONU has been incorrectly connected if the transmission source addresses do not match before and after the point in time, and
    the OLT has been incorrectly connected if the MEG-IDs do not match before and after the point in time.

4. The monitoring method according to claim 3, further comprising:
    detecting a MAC frame in the received signal beam;
    determining a type of the optical communication system based on a preamble of the MAC frame; and
    extracting the OAM frame from the received signal beam if the optical communication system is of a point-to-point type.

* * * * *